(12) United States Patent
Hirunuma et al.

(10) Patent No.: US 6,930,830 B2
(45) Date of Patent: Aug. 16, 2005

(54) BINOCULAR TELESCOPE

(75) Inventors: Ken Hirunuma, Tokyo (JP); Keiichi Hotta, Tokyo (JP); Gouji Funatsu, Saitama (JP)

(73) Assignee: PENTAX Corporation, Tokyo (JP)

( * ) Notice: Subject to any disclaimer, the term of this patent is extended or adjusted under 35 U.S.C. 154(b) by 15 days.

(21) Appl. No.: 10/355,044

(22) Filed: Jan. 31, 2003

(65) Prior Publication Data

US 2003/0151808 A1 Aug. 14, 2003

(30) Foreign Application Priority Data

Feb. 12, 2002 (JP) .................................... P2002-033597

(51) Int. Cl.⁷ .............................................. G02B 23/00
(52) U.S. Cl. ...................... 359/412; 359/407; 359/417
(58) Field of Search ................................ 359/399–432, 359/480–482, 819–830, 474, 817; 351/155–158

(56) References Cited

U.S. PATENT DOCUMENTS

| | | | |
|---|---|---|---|
| 4,067,027 A | 1/1978 | Yamazaki | 396/432 |
| D259,569 S | 6/1981 | Nishioka | D16/133 |
| D262,632 S | 1/1982 | Yamazaki | D16/208 |
| D265,479 S | 7/1982 | Yamazaki | D16/133 |
| 5,604,631 A * | 2/1997 | Gelardi et al. | 359/412 |
| 5,640,271 A * | 6/1997 | Nishitani et al. | 359/412 |
| 5,729,384 A * | 3/1998 | Nishitani et al. | 359/412 |
| 5,896,209 A * | 4/1999 | Funatsu | 359/417 |
| 5,903,387 A * | 5/1999 | Tomikawa et al. | 359/412 |
| 5,930,035 A | 7/1999 | Funatsu | 359/417 |
| 6,014,253 A | 1/2000 | Funatsu | 359/418 |
| 6,088,053 A | 7/2000 | Hammack et al. | 348/61 |
| 6,175,447 B1 * | 1/2001 | Koide et al. | 359/417 |
| 6,542,294 B2 * | 4/2003 | Funatsu | 359/407 |
| 2001/0028498 A1 | 10/2001 | Haga et al. | 359/407 |

FOREIGN PATENT DOCUMENTS

| | | |
|---|---|---|
| JP | 10-126814 | 10/1981 |
| JP | 6-2330 | 1/1994 |
| JP | 2001281555 | 10/2001 |
| WO | 9959019 | 11/1999 |
| WO | 01/52531 | 7/2001 |

OTHER PUBLICATIONS

English Language Translation for JP. Appln. No. 6–2330.
English Language Abstract of JP 56–126814.

* cited by examiner

Primary Examiner—Thong Q Nguyen
(74) Attorney, Agent, or Firm—Greenblum & Bernstein, P.L.C.

(57) ABSTRACT

A binocular telescope comprises right and left slide plates, and right and left mount plates disposed on the right and left slide plates. Right and left telescopic optical systems are mounted on the right and left slide plates which can be moved to adjust interpupillary distance for a user. A part of the right telescopic optical system is mounted on the right mount plate, and a part of the left telescopic optical system is mounted on the left mount plate. The right and left mount plates are moved along the optical axes of the right and left telescopic optical systems, to perform a focusing operation. The right and left slide plates have straight portions extending parallel to the optical axes. The right and left mount plates have right and left guide shoes slidably engaged with the straight portions.

9 Claims, 5 Drawing Sheets

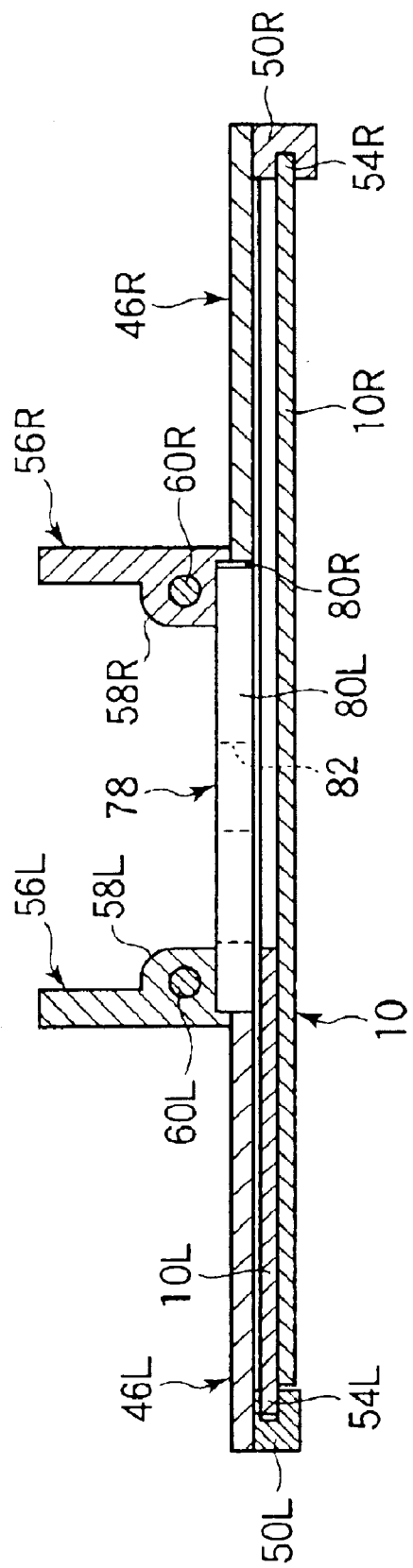

BINOCULAR TELESCOPE

BACKGROUND OF THE INVENTION

1. Field of the Invention

The present invention relates to a binocular telescope having a right telescopic optical system and a left telescopic optical system which can be moved rightward and leftward relative to each other, so that the interpupillary distance can be adjusted.

2. Description of the Related Art

Conventionally, in the binocular telescope described above, the right and left telescopic optical systems are mounted on right and left slide plates, which are partially overlapped, so that the right and left slide plates can slidably move rightward and leftward. Namely, by moving the right and left slide plates rightward and leftward relative to each other, the distance between the optical axes of the right and left telescopic optical systems, i.e., the interpupillary distance, is adjusted.

In such a binocular telescope with an interpupillary distance adjusting mechanism using slide plates (hereinafter referred to as a slide-type binocular telescope), when performing a focusing operation for the right and left telescopic optical systems, it is necessary to move a part of each of the right and left telescopic optical systems along the optical axis. For example, an erecting prism system and an ocular lens system must be moved relative to an objective lens system.

In this case, a right mount plate for supporting a part of the right telescopic optical system, or the erecting prism system and the ocular lens system, for example, is disposed on the right slide plate, and the objective lens system is disposed at a stationary position on the right slide plate, so that the right mount plate is moved along the optical axis relative to the objective lens whereby the right telescope optical system focuses. Similarly, a left mount plate for supporting the erecting prism system and the ocular lens system of the left telescopic optical system is disposed on the left slide plate, and the objective lens system is disposed at a stationary position on the left slide plate, so that the left mount plate is moved along the optical axis relative to the objective lens whereby the left telescope optical system focuses.

Further, in the binocular telescope, the focusing operations of the right and left telescope optical systems must be performed simultaneously, which means that the right and left slide plates must be moved along the optical axes of the right and left telescopic optical systems in synchronization with each other.

As may be understood from the above, to give an interpupillary distance adjusting function and a focusing function to the slide-type binocular telescope, a very complex mechanism has to be housed in the casing of the binocular telescope. Usually, if a complex mechanism is bulky, the binocular telescope has a tendency to become large. However, a binocular telescope system is required to be compact. Further, the compact design has to be attained without added cost.

SUMMARY OF THE INVENTION

Therefore, an object of the present invention is to provide a slide-type binocular telescope, in which mechanisms for an interpupillary distance adjusting function and a focusing function are as compact as possible, and can be manufactured at a low cost.

According to the present invention, there is provided a binocular telescope comprising a right slide plate, a left slide plate, a right mount plate, and a left mount plate.

A right telescopic optical system is mounted on the right slide plate, which has a first straight portion extending parallel to the optical axis of the right telescopic optical system. A left telescopic optical system is mounted on the left slide plate, which has a second straight portion extending parallel to the optical axis of the left telescopic optical system. The right slide plate and the left slide plate are movable relative to each other so that an interpupillary distance for a user is adjusted. A part of the right telescopic optical system is mounted on the right mount plate, which is movably supported by the right slide plate so that the right telescopic optical system is focused. The right mount plate has a right guide shoe slidably engaged with the first straight portion. A part of the left telescopic optical system is mounted on the a left mount plate. The left mount plate is movably supported by the left slide plate so that the left telescopic optical system is focused. The left mount plate has a left guide shoe slidably engaged with the second straight portion.

Preferably, the first straight portion is formed on a right edge of the right slide plate, and the second straight portion is formed on a left edge of the left slide plate. Further, the right guide shoe may be provided on a first surface of the right mount plate, which faces the right slide plate, and the left guide shoe may be provided on a second surface of the left mount plate, which faces the left slide plate.

The right guide shoe may be formed to enclose the first straight portion that extends in parallel to the optical axis of the right telescopic optical system, and the left guide shoe may be formed to enclose the second straight portion that extends in parallel to the optical axis of the left telescopic optical system.

Preferably, the right slide plate is provided with a right guide member, which extends parallel to the optical axis of the right telescopic optical system, and with which the right mount plate is slidably engaged, and the left slide plate is provided with a left guide member, which extends parallel to the optical axis of the left telescopic optical system, and with which the left mount plate is slidably engaged. In this case, the right guide shoe may be located at the rightmost side of the right mount plate, and a first engaging portion may be located at a leftmost side of the right mount plate, the right guide member being slidably inserted in the first engaging portion; and the left guide shoe may be located at the leftmost side of the left mount plate, and a second engaging portion may be located at a rightmost side of the left mount plate, the left guide member being slidably inserted in the second engaging portion.

The binocular telescope may further comprise a connecting mechanism that connects the right mount plate and the left mount plate so as to move the right mount plate and the left mount plate integrally, the connecting mechanism extending and contracting in accordance with a relative movement of the right slide plate and the left slide plate.

Preferably, the right mount plate is positioned between the right guide shoe and the right guide member in the thickness direction of the right mount plate, and the left mount plate is positioned between the left guide shoe and the left guide member in the thickness direction of the left mount plate.

BRIEF DESCRIPTION OF THE DRAWINGS

The objects and advantages of the present invention will be better understood from the following description, with reference to the accompanying drawings in which:

FIG. 5 is a transverse sectional view observed along line V—V of FIG. 2.

DESCRIPTION OF THE PREFERRED EMBODIMENTS

Figure 1:
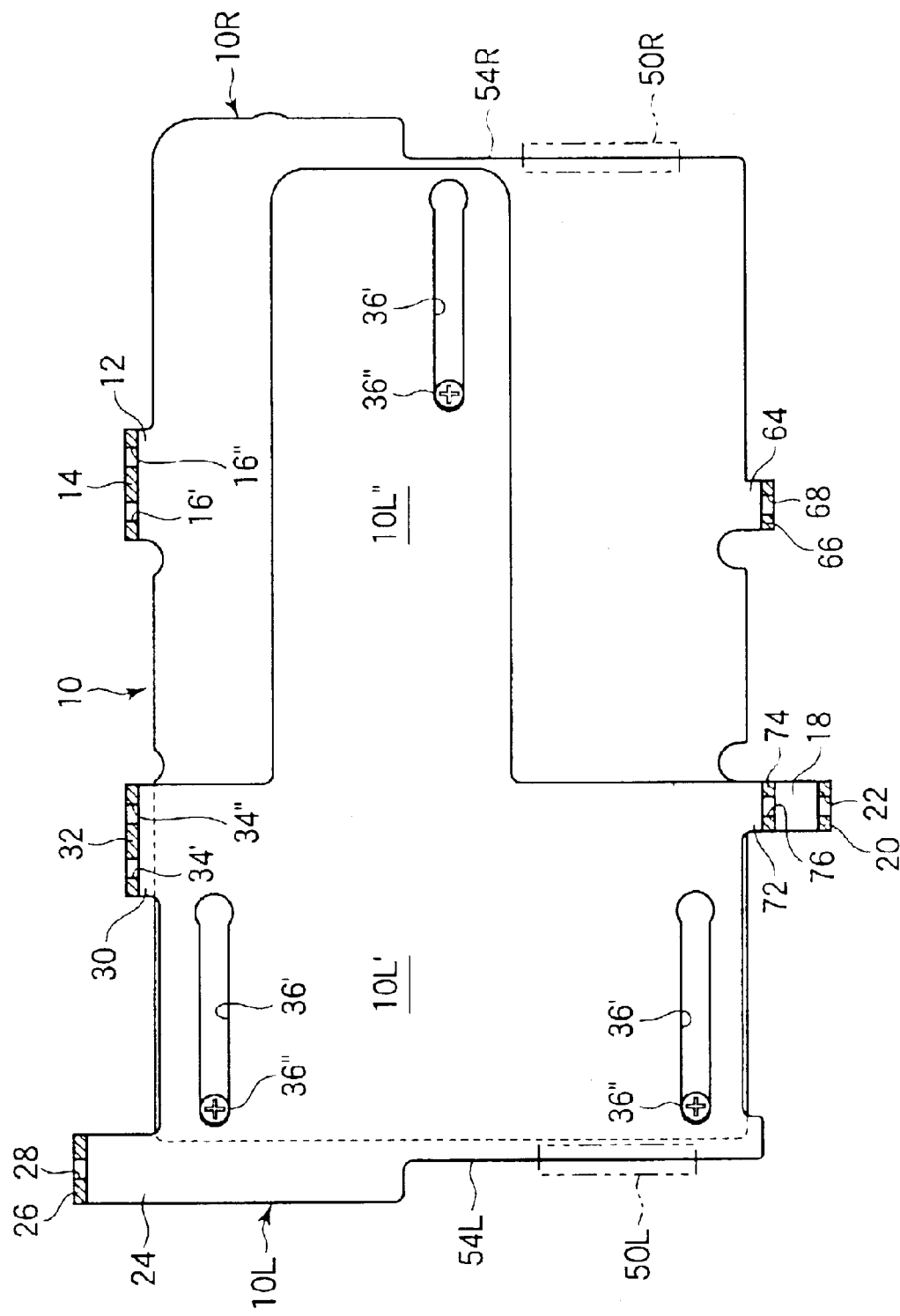
FIG. 1 is a plan view of a support-plate assembly housed in a casing of a binocular telescope of an embodiment of the present invention.

The present invention will be described below with reference to the embodiments shown in the drawings.

FIG. 1 is a plan view of a support-plate assembly 10 housed in a casing (not shown) of a binocular telescope of an embodiment of the present invention. The support-plate assembly 10 is provided for supporting a pair of telescopic optical systems, i.e., a right telescopic optical system and a left telescopic optical system, as described later. The pair of telescopic optical systems is mounted on the support-plate assembly 10 in such a manner that an ocular lens system is located at a lower side in FIG. 1. Therefore, when a user faces the ocular lens systems, the right and left sides in FIG. 1 coincide with the right and left sides for the user. Note that, in the following description, the terms "right side" and "left side" are used to mean the right and left sides when the user faces the ocular lens systems, if the terms are not defined as having another meaning. Further, the terms "forward" and "backward" are used to indicate directions toward the objective lens system side and toward the ocular lens system side of the telescopic optical systems, if the terms are not defined as having another meaning.

As shown in FIG. 1, the support-plate assembly 10 is composed of a right slide plate 10R and a left slide plate 10L slidably disposed on the right slide plate 10R. The right slide plate 10R is a rectangular plate, and the left slide plate 10L has a rectangular portion 10L', having approximately the same length as the length of the right slide plate 10R, in the forward and backward directions, and an extending portion 10L", integrally connected to and extending rightward from the rectangular portion 10L'.

The support-plate assembly 10 is housed in the not shown casing of the binocular telescope, as described above. The casing is composed of a right casing section and a left casing section which are slidably fit with each other, and which can be extended and contracted in the right and left directions. The right slide plate 10R is connected to the right casing section, and the left slide plate 10L is connected to the left casing section. Namely, when the right and left casing sections are moved relatively to each other in the right and left directions, the right and left slide plates 10R and 10L are also moved in the right and left directions, with the right and left casing sections.

A projecting portion 12 is extended from an upper periphery of the right slide plate 10R so as to fix the right slide plate 10R to the right casing section. An upright fragment 14 is formed on the projecting portion 12 by bending it. In FIG. 1, the upright fragment 14 is indicated as a sectional view, and two holes 16' and 16" are formed in the upright fragment 14. Further, another projecting portion 18 is extended from a lower periphery of the right slide plate 10R and an upright fragment 20 is formed on the projecting portion 18 by bending it. The upright fragment 20 is also indicated as a sectional view, and a hole 22 is formed in the upright fragment 20.

Thus, screws (not shown) are inserted in the holes 16" and 22 of the upright fragments 14 and 20 and threaded in the right casing section, so that the right slide plate 10R is fixed to the right casing section. Note that the other hole 16' of the upright fragment 18 is used for the other object as described later.

A projecting portion 24 is extended from an upper-left corner of the rectangular portion 10L' so as to fix the left slide plate 10L to the left casing section, and an upright fragment 26 is formed on the projecting portion 24 by bending it. In FIG. 1, the upright fragment 26 is indicated as a sectional view, and a hole 28 is formed in the upright fragment 26. Further, another projecting portion 30 is extended from an upper periphery of the rectangular portion 10L' of the left slide plate 10L, and an upright fragment 32 is formed on the projecting portion 30 by bending it. The upright fragment 32 is also indicated as a sectional view, and holes 34' and 34" are formed in the upright fragment 32.

Thus, screws (not shown) are inserted in the holes 28 and 34' of the upright fragments 26 and 30 and threaded in the left casing section, so that the left slide plate 10L is fixed to the left casing section. Note that the other hole 34" of the upright fragment 32 is used for another object as described later.

Two guide slots 36' are formed in the rectangular portion 10L' of the left slide plate 10L, and another guide slot 36' is formed in the extending portion 10L". The three guide slots 36' are parallel to each other, and extend in the right and left directions by the same length. Guide pins 36" fixed on the right slide plate 10R are slidably engaged in the guide slots 36'. Thus, a relative movable distance of the right and left slide plates 10R and 10L, or a relative movable distance of the right and left casing sections is determined by the length of each of the guide slots 36'.

Figure 2:
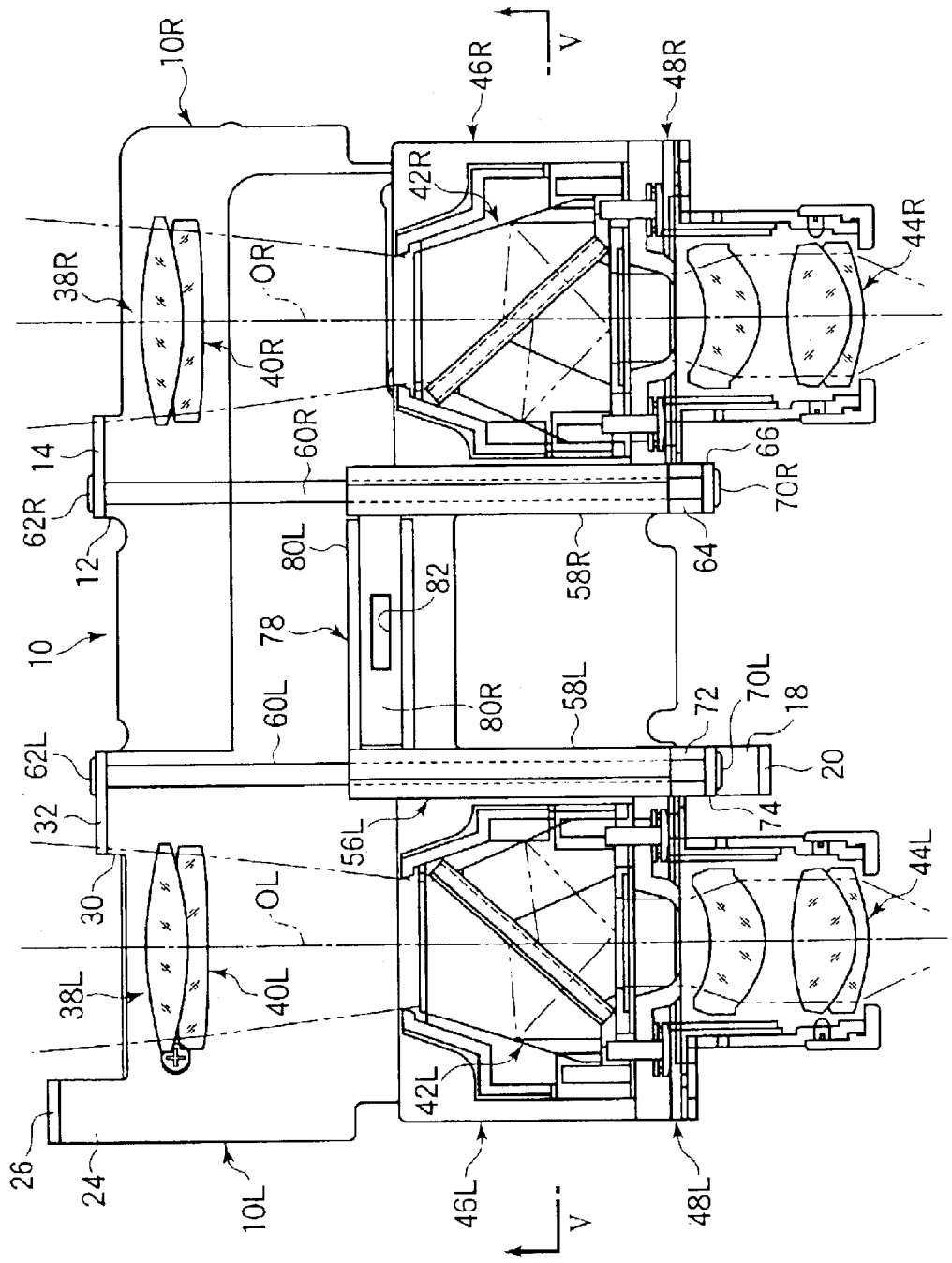
FIG. 2 is a plan view showing a pair of telescopic optical systems mounted on the support-plate assembly.

As shown in FIG. 2, a pair of telescopic optical systems, i.e., a right telescopic optical system 38R and a left telescopic optical system 38L, are mounted on the support-plate assembly 10. The right telescopic optical system 38R is mounted on the right slide plate 10R, and contains an objective lens system 40R, an erecting prism system 42R, and an ocular lens system 44R. The left telescopic optical system 38L is mounted on the left slide plate 10L, and contains an objective lens system 40L, an erecting prism system 42L, and an ocular lens system 44L. The optical axes of the right and left telescopic optical systems 38R and 38L are perpendicular to the relative moving directions of the right and left slide plates 10R and 10L. Thus, when the right and left casing sections are moved relative to each other, the right and left slide plates 10R and 10L are also moved relative to each other, so that the distance between the optical axes of the pair of telescopic optical systems 38R and 38L, i.e., the interpupillary distance for a user, is adjusted. Namely, as shown in FIG. 2, the interpupillary distance adjustment is carried out by separating the optical axis OR of the right telescopic optical system and the optical axis OL of the left telescopic optical system from each other on a plane P containing the optical axes OR and OL.

The objective lens system 40R of the right telescopic optical system 38R is fixed on the right slide plate 10R, and the erecting prism system 42R and the ocular lens system 44R can be moved back and forth with respect to the objective lens system 40R, so that the right telescopic optical system 38R can be focused. Similarly, the objective lens system 40L of the left telescopic optical system 38L is fixed on the left slide plate 10L, and the erecting prism system 42L and the ocular lens system 44L can be moved back and forthwith respect to the objective lens system 38L, so that the left telescopic optical system 38L can be focused.

Figure 3:
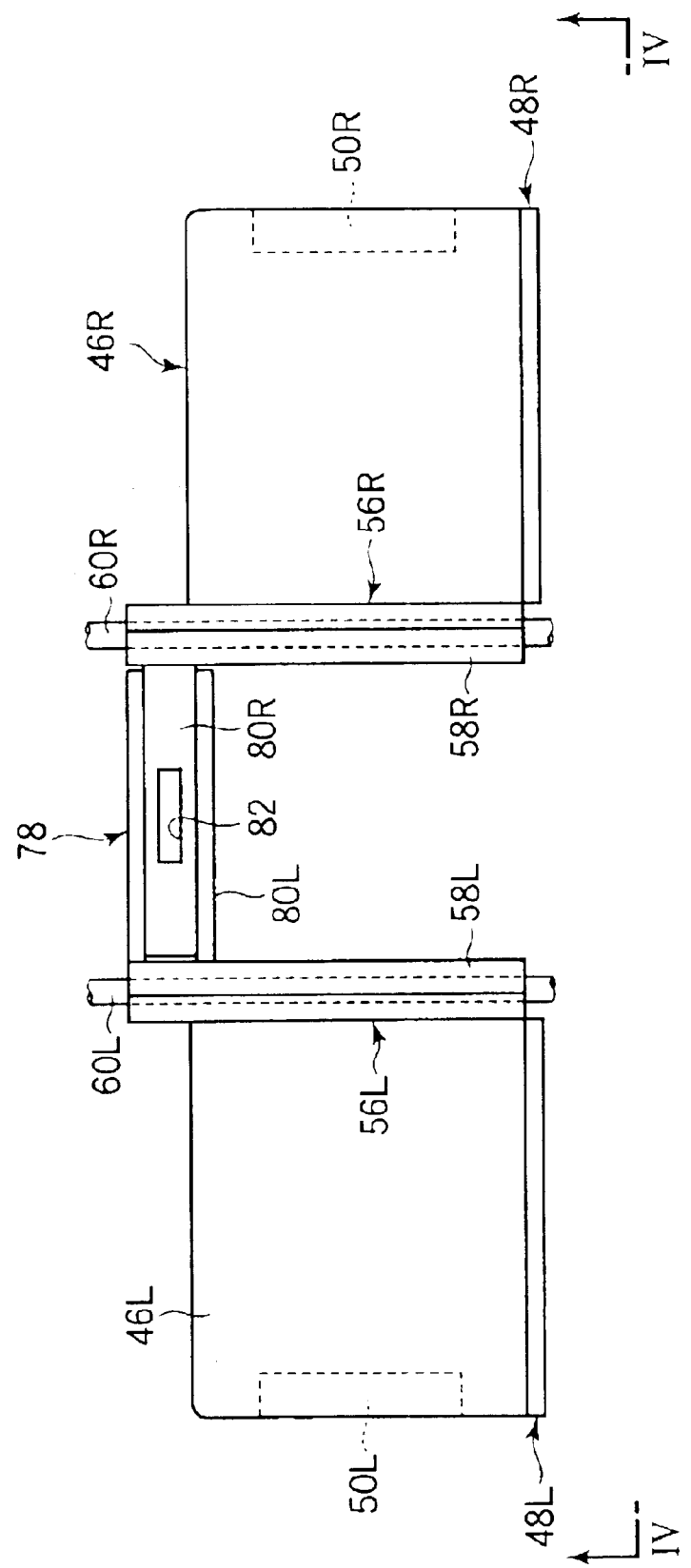
FIG. 3 is a plan view showing right and left mount plates on which erecting prism systems and ocular lens systems contained in right and left telescopic optical systems are mounted.
Figure 4:
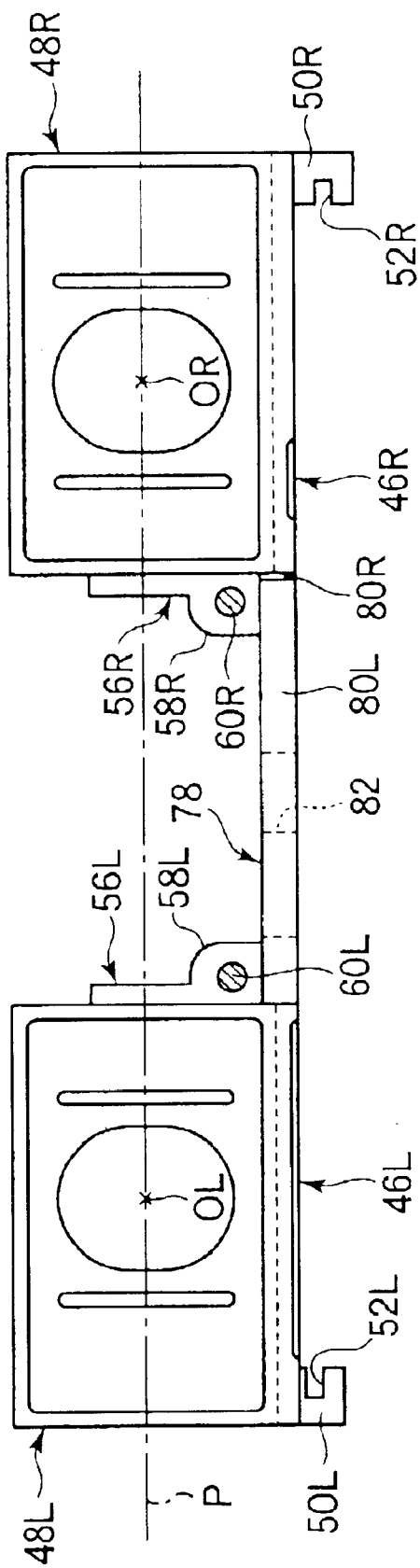
FIG. 4 is an elevational view observed along line IV—IV of FIG. 3.

A right mount plate 46R and a left mount plate 46L, indicated in FIG. 3, are provided for focusing the pair of telescopic optical systems 38R and 38L as describe above. The right mount plate 46R is disposed on the right slide plate 10R to be movable backward and forward. The erecting prism system 42R of the right telescopic optical system 38R is mounted on the right mount plate 46R, as shown in FIG. 2. As shown in FIGS. 3 and 4, an upright plate 48R is provided along a rear periphery of the right mount plate 46R. The right ocular lens system 44R is attached to the upright plate 48R, as shown in FIG. 2.

Similarly, a left mount plate 46L is disposed on the left slide plate 10L to be movable back and forth. Further, as shown in FIG. 2, the erecting prism system 42L of the left telescopic optical system 38L is mounted on the left mount plate 46L. As shown in FIGS. 3 and 4, an upright plate 48L is provided along a rear periphery of the left mount plate 46L. The left ocular lens system 44L is attached to the upright plate 48L, as shown in FIG. 2.

As shown in FIGS. 3 and 4, the right mount plate 46R is provided with a right guide shoe 50R secured to the underside thereof in the vicinity of the right side edge thereof. The right guide shoe 50R is formed with a guide groove 52R. On the other hand, as shown in FIG. 1, a right straight edge 54R is formed on the right edge of the right slide plate 10R, and extends partly along the right edge. The right straight edge 54R is perpendicular to the relative moving directions of the right and left slide plates 10R and 10L. Thus, the right guide shoe 50R is formed to enclose the right straight edge 54R that extends parallel to the optical axis of the right telescopic optical system 38R. As shown in FIG. 5, in a state in which the right mount plate 46R is placed on the right slide plate 10R, the right straight edge 54R is slidably engaged with the guide groove 52R of the right guide shoe 50R. Namely, a part of the right edge of the right slide plate 10R, i.e., the right straight edge 54R functions as a guide rail for the right guide shoe 50R.

Similarly, the left mount plate 46L is provided with a left guide shoe 50L secured to the underside thereof in the vicinity of the left side edge thereof. The left guide shoe 50L is formed with a guide groove 52L. On the other hand, a left straight edge 54L is formed on the left edge of the left slide plate 10L, and extends partly along the left edge. The left straight edge 54L is perpendicular to the relative moving directions of the right and left slide plates 10R and 10L. Thus, the left guide shoe 50L is formed to enclose the left straight edge 54L that extends parallel to the optical axis of the left telescopic optical system 38L. As shown in FIG. 5, in a state in which the left mount plate 46L is placed on the left slide plate 10L, the left straight edge 54L is slidably engaged with the guide groove 52L of the left guide shoe 50L. Thus, a part of the left edge of the left slide plate 10L, i.e., the left straight edge 54L functions as a guide rail for the left guide shoe 50L.

Note that, for simplicity of the drawing, the erecting prism systems 42R and 42L mounted on the right and left mount plates 46R and 46L are omitted in FIG. 5.

The right mount plate 46R has a side wall 56R provided along a left side edge thereof, and a lower portion of the side wall 56R is formed as a swollen portion 58R having a through bore for slidably receiving a guide rod 60R. Namely, the swollen portion 58R functions as an engaging portion in which the guide rod 60R is slidably inserted. As shown in FIG. 2, the guide rod 60R extends in the backward and forward directions of the right slide plate 10R, i.e., along the optical axis of the right telescopic optical system 38R, and the front end thereof is securely supported by the right slide plate 10R. Namely, a female thread hole is formed in the front end of the guide rod 60R, and a screw 62R is inserted in the hole 16' (FIG. 1) of the upright fragment 14 and threaded in the female thread hole, so that the front end of the guide rod 60R is fixed to the right slide plate 10R.

The rear end of the guide rod 60R is securely supported by the right slide plate 10R in a similar way as the above. Namely, as shown in FIG. 1, a projection 64 is projected from a rear end portion of the right slide plate 10R, and an upright fragment 66 is formed by bending the projection 64. In FIG. 1, the upright fragment 66 is indicated as a sectional view, and a hole 68 is formed in the upright fragment 66 to align with the hole 16' of the upright fragment 14. A female thread hole is formed in the rear end of the guide rod 60R, and a screw 70R (FIG. 2) is inserted in the hole 68 of the upright fragment 66 and threaded in the female thread hole, so that the rear end of the guide rod 60R is fixed to the right slide plate 10R.

Thus, the right mount plate 46R can be moved back and forth along the right straight edge 54R and the guide rod 60R, so that the distances from the erecting prism system 42R and the ocular lens system 44R to the objective lens system 40R is adjusted, and thus the right telescopic optical system 38R is focused.

Similarly, the left mount plate 46L has a side wall 56L provided along a right side edge thereof, and a lower portion of the side wall 56L is formed as a swollen portion 58L having a through bore for slidably receiving a guide rod 60L. Namely, the swollen portion 58L functions as an engaging portion in which the guide rod 60L is slidably inserted. As shown in FIG. 2, the guide rod 60L extends in the backward and forward directions of the left slide plate 10L, i.e., along the optical axis of the left telescopic optical system 38L, and the front end thereof is securely supported by the left slide plate 10L. Namely, a female thread hole is formed in the front end of the guide rod 60L, and a screw 62L is inserted in the hole 341" (FIG. 1) of the upright fragment 32 and threaded in the female thread hole, so that the front end of the guide rod 60L is fixed to the left slide plate 10L.

The rear end of the guide rod 60L is securely supported by the left slide plate 10L in a similar way as the above. Namely, as shown in FIG. 1, a projection 72 is projected from a rear end portion of the rectangular portion 10L' of the left slide plate 10L, and an upright fragment 74 is formed by bending the projection 72. In FIG. 1, the upright fragment 74 is indicated as a sectional view, and a hole 76 is formed in the upright fragment 74 to align with the hole 34" of the upright fragment 32. A female thread hole is formed in the rear end of the guide rod 60L, and a screw 70L (FIG. 2) is inserted in the hole 76 of the upright fragment 74 and threaded in the female thread hole, so that the rear end of the guide rod 60L is fixed to the left slide plate 10L.

Thus, the left mount plate 46L can be moved backward and forward along the left straight edge 54L and the guide rod 60L, so that the distances from the erecting prism system 42L and the ocular lens system 44L to the objective lens system 40L is adjusted, and thus the left telescopic optical system 38L is focused.

As shown in FIGS. 3 and 4, the right guide shoe 50R is located at the rightmost side of the bottom surface of the right mount plate 46R, the bottom surface facing the right slide plate 10R, and the right side surface of the right mount plate 46R and the right side surface of the right guide shoe 50R are flush with each other. Accordingly, the right casing section (not shown) can be placed in such a manner that a right side wall of the right casing section abuts against the right end face of the right mount plate 46R.

Similarly, the left guide shoe 50L is located at the leftmost side of the bottom surface of the left mount plate 46L, the bottom surface facing the left slide plate 10L, and the left side surface of the left mount plate 46L and the left side surface of the left guide shoe 50L are flush with each other. Accordingly, the left casing section (not shown) can also be placed in such a manner that a left side wall of the left casing section abuts against the left end face of the left mount plate 46L.

Thus, the width of the binocular telescope (the length in the right and left direction, i.e., interpupillary distance adjusting direction) can be reduced.

The right side of the right mount plate 46R is slidably supported at the right guide shoe 50R, and the left side of the right mount plate 46R is slidably supported by the right guide rod 60R inserted in the bore of the swollen portion 58R. Namely, the part on which the erecting prism system 42R, contained in the right telescopic optical system 38R, is mounted is slidably supported by two portions, which are separated by the maximum distance in the right and left direction with respect to the optical axis of the right telescopic optical system 38R. This is also true for the left mount plate 46L. Thus, the erecting prism systems 42R and 42L can be stably moved along the optical axes OR and OL of the telescopic optical systems 38R and 38L with a high accuracy.

Further, in the embodiment, the right mount plate 46R is positioned between the right guide shoe 50R and the swollen portion 58R (or the guide rod 60R) in the thickness direction (the thickness of the binocular telescope being a direction perpendicular to the interpupillary distance adjusting direction), and the thickness of the swollen portion 58R is less than the thickness of the erecting prism systems 42R. Namely, a part, by which the guide mechanism of the right mount plate 46R affects the overall thickness of the binocular telescope, is only the added thickness of the right guide shoe 50R. This is also true for the guide mechanism of the left mount plate 46L.

Thus, the guide mechanism of the right mount plate 46R contributes to restraining the thickness of the binocular telescope.

As described above, according to the construction shown in FIGS. 3 and 4, the width (the size in the right and left direction) and the thickness (the size in the up and down direction) of the binocular telescope can be decreased, and the movable portions (42R, 42L, 44R, and 44L) of the right and left telescopic optical systems 38R and 38L can be moved with a high degree of accuracy and stability.

In the binocular telescope, it is necessary that the right and left telescopic optical systems 38R and 38L simultaneously focus, and therefore, the right and left mount plates 46R and 46L must be simultaneously moved along the optical axes of the right and left telescopic optical systems 38R and 38L. For the synchronized movement of the right and left mount plates 46R and 46L, these plates 46R and 46L may be interconnected to each other, but the interconnection must allow a relative movement of the right and left mount plates 46R and 46L in the right and left directions.

In this embodiment, as shown in FIGS. 2 and 3, the mount plates 46R and 46L are interconnected to each other by an expandable coupler 78. The expandable coupler 78 includes a rectangular lumber-like member 80R, and a forked member 80L in which the lumber-like member 80R is slidably received. As shown in FIGS. 2–5, the lumber-like member 80R is securely attached to the underside of the swollen portion 58R of the side wall 56R at the forward end thereof, and the forked member 80L is securely attached to the underside of the swollen portion 58L of the side wall 56L at the forward end thereof. Both members 80R and 80L have a length which is greater than the maximum breadth by which the interpupillary distance adjustment can be carried out. Namely, even though the right and left casing sections are extended from the retracted position to the maximum extended position, slidable engagement is maintained between the members 46R and 46L.

As shown in FIGS. 2 and 3, a rectangular opening 82 is formed in a central portion of the lumber-like member 80R. A movable member (not shown) is fit in the opening 82, and is moved along the optical axes of the right and left telescopic optical systems 38R and 38L due to a rotation of a rotary wheel (not shown) of the binocular telescope. Thus, a movement-conversion mechanism for converting a rotational movement of the rotary wheel into a linear movement of the movable member is provided between the rotary wheel and the movable member. Thus, due to the rotation of the rotary wheel, the right and left mount plates 46R and 46L are moved along the optical axes of the right and left telescopic optical systems 38R and 38L, so that focusing operation of the right and left telescopic optical systems 38R and 38L is performed simultaneously.

As described above, in the binocular telescope of the embodiment, the right straight edge 54R of the right slide plate 10R works as a guide rail when the right mount plate 46R is moved so that the right telescopic optical system 38R focuses, and the left straight edge 54L of the left slide plate 10L works as a guide rail when the left mount plate 46L is moved so that the left telescopic optical system 38L focuses. Namely, since a specific guide rail is not needed, the number of parts of the binocular telescope is reduced, and as a result, not only can the size of internal structures housed in the binocular telescope be compacted, but also the manufacturing cost can be reduced.

Although the embodiment of the present invention have been described herein with reference to the accompanying drawings, obviously many modifications and changes may be made by those skilled in this art without departing from the scope of the invention.

The present disclosure relates to subject matter contained in Japanese Patent Application No. 2002-033597 (filed on Feb. 12, 2002) which is expressly incorporated herein, by reference, in its entirety.

What is claimed is:

1. A binocular telescope comprising:
   a right slide plate on which a right telescopic optical system is mounted, said right slide plate having a first straight portion extending parallel to the optical axis of said right telescopic optical system;
   a left slide plate on which a left telescopic optical system is mounted, said left slide plate having a second straight portion extending parallel to the optical axis of said left telescopic optical system, said right slide plate and said left slide plate being movable relative to each other so that an interpupillary distance for a user is adjusted;
   a right mount plate on which a part of said right telescopic optical system is mounted, said right mount plate being movably supported by said right slide plate so that said right telescopic optical system is focused, said right mount plate having a single right mount plate guide shoe slidably engaged with said first straight portion, said right mount plate guide shoe extending along a substantial portion of a side edge of said right mount plate; and a left mount plate on which a part of said left telescopic optical system is mounted, said left mount plate being movably supported by said left slide plate so that said left telescopic optical system is focused, said left mount plate having a single left mount plate guide shoe slidably engaged with said second straight portion, said left mount plate guide shoe extending along a substantial portion of a side edge of said left mount plate.

2. A binocular telescope according to claim 1, wherein said first straight portion is formed on a right edge of said right slide plate, and said second straight portion is formed on a left edge of said left slide plate.

3. A binocular telescope according to claim 1, wherein said right mount plate guide shoe is provided on a first surface of said right mount plate, which faces said right slide plate, and said left mount plate guide shoe is provided on a second surface of said left mount plate, which faces said left slide plate.

4. A binocular telescope according to claim 1, wherein said right mount plate guide shoe is formed to enclose said first straight portion that extends parallel to the optical axis of said right telescopic optical system, and said left mount plate guide shoe is formed to enclose said second straight portion that extends parallel to the optical axis of said left telescopic optical system.

5. A binocular telescope according to claim 1, wherein said right slide plate is provided with a right guide member, which extends parallel to the optical axis of said right telescopic optical system, and with which said right mount plate is slidably engaged, and said left slide plate is provided with a left guide member, which extends parallel to the optical axis of said left telescopic optical system, and with which said left mount plate is slidably engaged.

6. A binocular telescope according to claim 5, wherein said right mount plate guide shoe is located at the rightmost side of said right mount plate, and a first engaging portion is located at a leftmost side of said right mount plate, said right guide member being slidably inserted in said first engaging portion; and said left mount plate guide shoe is located at the leftmost side of said left mount plate, and a second engaging portion is located at a rightmost side of said left mount plate, said left guide member being slidably inserted in said second engaging portion.

7. A binocular telescope according to claim 5, wherein said right mount plate is positioned between said right mount plate guide shoe and said right guide member in the thickness direction of said right mount plate, and said left mount plate is positioned between said left mount plate guide shoe and said left guide member in the thickness direction of said left mount plate.

8. A binocular telescope according to claim 1, further comprising a connecting mechanism that connects said right mount plate and said left mount plate so as to move said right mount plate and said left mount plate integrally, said connecting mechanism extending and contracting in accordance with a relative movement of said right slide plate and said left slide plate.

9. A binocular telescope according to claim 1, wherein at least a portion of said left slide plate and at least a portion of said right slide plate overlap in a direction generally orthogonal to the left optical axis and the right optical axis.

* * * * *